United States Patent Office 3,521,463
Patented July 21, 1970

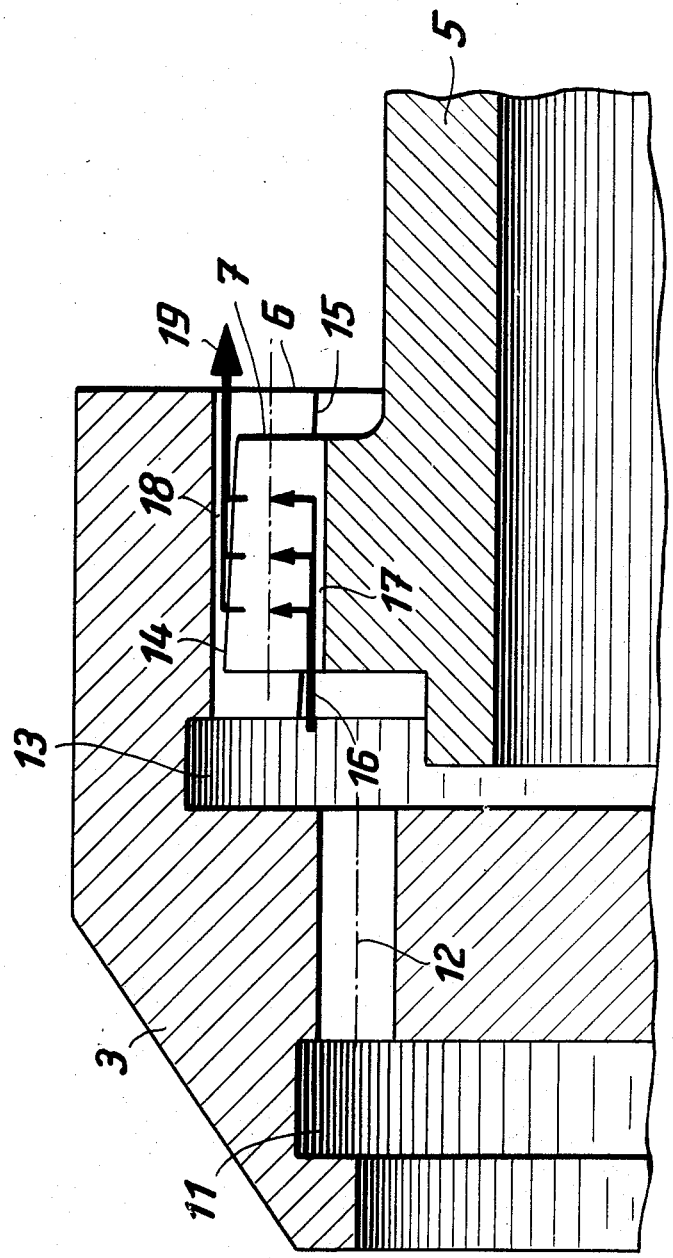

3,521,463
GEAR COUPLING
Günther Heidrich, Munich, Germany, assignor to
Alexander Stoeckicht, Munich, Germany
Filed Oct. 15, 1968, Ser. No. 767,698
Claims priority, application Germany, Oct. 21, 1967,
1,625,817
Int. Cl. F16d 3/54
U.S. Cl. 64—9                                             2 Claims

ABSTRACT OF THE DISCLOSURE

The gear coupling consists of two toothed hub members connected by a sleeve member with teeth at the end portions. The sleeve teeth are in mesh with the hub teeth. The crest edges of the teeth of cooperating hub and sleeve are sloped with respect to the coupling axis whereby wedge-shaped gaps are formed at the crest and at the bottom of each tooth. The wedge directions of these addendum and dedendum gaps are opposite to each other. This construction allows uniform continuous lubrication of the tooth flanks and results in an improvement of the centering of the coupling.

BACKGROUND OF THE INVENTION

The invention relates to a gear coupling consisting of two coupling hubs having concentric sets of teeth which are connected by means of a coupling sleeve having teeth at the two end portions thereof, the teeth being lubricated by means of a lubricant pressed between them.

The tendency for increased production with the smallest possible machine dimensions opens a wide field of application to gear couplings because it is these couplings, which, as compared with other types of couplings, are particularly capable of transferring high torques with small coupling diameters.

Double gear couplings consist of at least three individual members: the two coupling hubs and the coupling sleeve. With a known type of gear coupling construction the hubs lap over the end portions of the coupling sleeve. In this arrangement, internal teeth provided on the coupling hub are constantly in mesh with external teeth provided on the coupling sleeve end portion. However, an inverse construction is known as well in which the end portions of the coupling sleeve grip over the internally disposed coupling hubs. The internal teeth of the coupling sleeve, in this construction, are in mesh with the external teeth of the coupling hubs.

What is of decisive importance for a good operation characteristic with high-speed gear couplings apart, from a light weight as well as running balance, is the exact centering of the coupling sleeve with respect to the two coupling hubs throughout the entire speed range to be covered by the coupling.

Several possibilities of centering double gear couplings are known. For instance, gear couplings have been built in which the centering takes place directly by means of the flanks of the coupling teeth themselves or by the tooth crests contacting the tooth bottom faces of the counter toothing. In another known embodiment, the coupling sleeve is centered by a crowned spigot additionally arranged at the teeth.

All these known gear couplings, however, have the disadvantage that, when operated at higher speeds, the members of the coupling will radially expand under the influence of centrifugal force. The outer members having a larger diameter will expand more than the inner members. This will produce clearances of operation, namely both flank clearance and centering clearance which exceed considerably the play at rest due to manufacture. Then there will no longer be a centering of the coupling sleeve produced either by means of the tooth flanks, the tooth crests or the spigot, so that eccentricities may occur within the coupling, which in turn generate very great out-of-balance forces. These forces may easily reach orders which may become a serious danger for the complete drive unit.

The centering at the tooth crests and by means of a spigot, in addition, constitute a redundancy in determination which prevents a uniform bearing of all the teeth for torque transmission and thus a well-defined uniform distribution of the force. It is therefore more recommendable to produce the centering directly at the tooth flanks and, furthermore, to take suitable measures to increase the centering effect of the teeth. Known measures for this are, for instance, a pressure angle of the tooth profile of more than 20°, longitudinally crowned tooth flanks, a lowest possible weight of the coupling sleeve to be centered, hardening of the coupling teeth by nitridation and good continuous lubrication.

In order to obtain said measures, the following features have already become known: radial oil supply bores in the center of each tooth gap of the external teeth, convex shape of the tooth crests of the internal teeth and tapering of the teeth toward their bearing flank faces. These measures, however, are expensive. This type of lubricant guidance does not allow adjustment of the pressure at which the oil is pressed between the teeth. In addition the lubricant has to be brought to the center of the tooth crests first so as to be adapted to be distributed in both directions. This causes a nonuniform distribution because the drain of the lubricant is not particularly controlled.

In accordance with my copending U.S. application Ser. No. 767,697, filed Oct. 15, 1968, an automatic centering is obtained even with high operational speeds in that the internally disposed portions carrying external teeth are axially slotted at least in the region of said teeth. The slots allow the internally disposed portions of the gear coupling to expand more than the outer portion under the influence of the centrifugal forces. A tooth flank contact free from play will then be obtained, especially at high speeds, and thus a good centering is achieved.

It is the object of the invention to obtain a further improvement of the centering by intensification of the continuous lubrication in the region of the tooth flanks.

SUMMARY OF THE INVENTION

In the gear coupling according to the invention, the improvement is obtained in that the edges of the individual tooth crests, both of the internal and external teeth being in mesh with each other, are designed to be tapered obliquely with respect to the coupling axis. In this way wedge-shaped gaps are formed at the crest and the bottom of each tooth, the wedge directions of these addendum and dedenum gaps, respectively, being opposite to each other.

This construction of the teeth entails a continuous reduction and enlargement, respectively, of the crest play of the coupling teeth and thereby an equalization of the continuous lubrication. With this, in turn, a reduction of the friction between the tooth flanks and an improvement of the centering effect of the coupling is produced.

A particularly uniform distribution of the lubricant results if the angles of slope of the crest edges are equal to each other.

It is known in connection with gears used in couplings, to provide axially extending slopes. These slopes are, however, always provided at the tooth bottoms.

BRIEF DESCRIPTION OF THE DRAWING

The invention will now be described in more detail by way of an embodiment provided with teeth according to the invention.

The drawing shows a partial longitudinal sectional view of teeth according to the invention in an enlarged scale, the arrows indicating the forced flow of the lubricant.

DESCRIPTION OF A PREFERRED EMBODIMENT

In the drawing one tooth according to the invention is shown in detail. The left-hand upper half of the gear coupling is represented together with the left-hand upper half of the coupling sleeve 5. The portion of the tooth coupling shown in the drawing is repeated on the right-hand side (not shown) in a mirror-inverted arrangement. The hub 3 is provided with an internally toothed shoulder. The teeth 6 of the shoulder are in mesh with the external teeth 7 of the coupling sleeve 5.

The lubricant, for instance, lubricating oil, is supplied to the gear coupling via nozzle pipes (not shown). These nozzle pipes inject the lubricating oil into outer pressure chambers 11, from which it flows into inner pressure chambers 13 via paraxial bores 12. These inner pressure chambers 13 border on the annular volume with the meshing teeth.

The crest edges 14 and 15 of the teeth 6 and 7 extend obliquely towards the coupling axis. The edges 14 and 15 of the respective sets of teeth which have like angles of slope, rotate in conical planes. This construction allows the lubricating oil to penetrate into an annular gap 17 defined by the crest edges and the opposed teeth bottom edge tapering in the form of a wedge, in the direction of the arrow 16; to flow radially outwardly between the tooth flanks being uniformly distributed; and to be collected finally in an annular gap 18 flaring in the shape of a wedge. The lubricating oil then drains paraxially in the direction of the arrow 19 from the gap 18. The passage of the lubricating oil between the tooth flanks is still enhanced by the centrifugal force acting on the lubricating oil and imparting to it a radial pressure component. The increasing throttling generated by the constant reduction of the gap 17, as well as the centrifugal forces present in the oil itself, are effective to bring about a distribution of the oil about the entire tooth flanks which produces an excellent lubricating effect. The wedge-shaped tapering of the introducing gap 17 and the corresponding wedge-shaped flaring of the outlet gap 18 lead to a steady uniform oil flow which, on the one hand, reduces the friction value within the teeth and dissipates the developing friction heat but which, on the other hand, also prevents the small solid particles present in the oil from settling in dead spaces of the meshing teeth and leading to a disturbance of the lubrication.

The increase of the centric adjustability of the coupling by the measure taken in accordance with the invention, in addition, results in a uniform distribution of forces even at high speeds; also all the teeth are uniformly participating in the torque transmission and the working life of the coupling is considerably increased, which working life depends primarily on overstressing the tooth flanks.

The obliquity of the tooth crest edges with respect to the coupling axis may be used to advantage not only in connection with the couplings shown in the drawing but also with non-slotted low-speed tooth couplings wherein the tooth forces resulting from the torque transmission suffice for a steady exact centering.

What I claim is:

1. A gear coupling comprising, in combination, a hub member having an axis of rotation and an annular set of teeth concentrically defined thereon, a sleeve member having an axis of rotation coaxial to said hub member axis and having an annular set of teeth concentrically defined thereon meshing with the teeth of said hub member, said sets of teeth including teeth having substantially linear crest and bottom edges extending the axial width of the teeth, said crest edges of a common set being obliquely disposed with respect to said axis of hub and sleeve member rotation in the same axial direction, the crest edges of said set of teeth of said hub member being inclined to said hub and sleeve member axis in the opposite direction with respect to the inclination of the crest edges of the set of teeth of said sleeve member, said crest edges defining wedge-shaped clearance passages with the opposed teeth bottom edges, and lubricating oil supply means in communication with said meshing sets of teeth.

2. In a gear coupling as in claim 1 wherein the angles of inclination of said crest edges of said teeth defined on said hub and sleeve members to the axis of said members are equal.

References Cited

UNITED STATES PATENTS

| | | | |
|---|---|---|---|
| 1,942,782 | 1/1934 | Smith | 64—9 |
| 2,338,758 | 1/1944 | Fast | 64—9 |
| 2,726,523 | 12/1955 | Zrodowski | 64—9 |

JAMES A. WONG, Primary Examiner